July 11, 1950 — L. E. CARSON — 2,514,692

FASTENER

Filed Sept. 23, 1946

Inventor
Lawrence E. Carson
Barkelew & Scandlebury
Attys.

Patented July 11, 1950

2,514,692

UNITED STATES PATENT OFFICE 2,514,692

FASTENER

Lawrence E. Carson, Alhambra, Calif.

Application September 23, 1946, Serial No. 698,625

15 Claims. (Cl. 85—5)

This invention relates to fasteners adapted to be quickly and easily applied and released; and although, as shown in the accompanying drawings and described herein, the fastener is particularly adapted and designed to be used for temporarily securing parts together, it may also be used as a permanent fastener, or as an anchor or the like to which something else may be attached.

The present application is a continuation in part of my former application, now abandoned, Serial No. 566,413, filed December 4, 1944, which has now been superseded by my co-pending application Ser. No. 792,787, filed December 19, 1947.

The general object of the invention is to provide a fastener of the type indicated, of extreme simplicity and high effectiveness, coupled with ease and simplicity of manipulation and low manufacturing cost. The means by which this general object is attained, together with other characteristic features and advantages of my invention will be best understood from the following description of certain typical forms which my fastener can take. These are illustrated in the accompanying drawings, in which.

Figure 5:
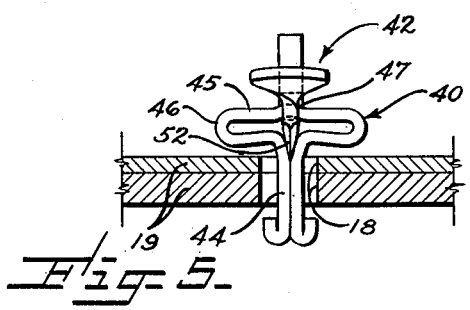
Figure 6:
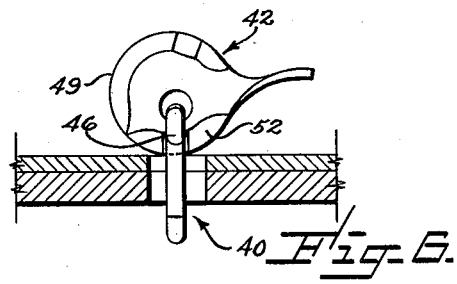
Figure 7:
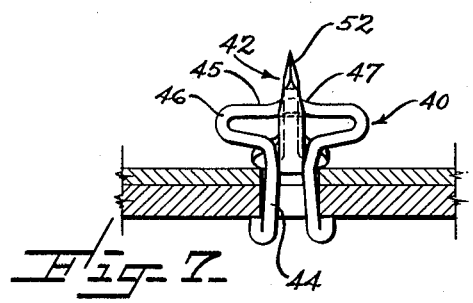
Figure 8:
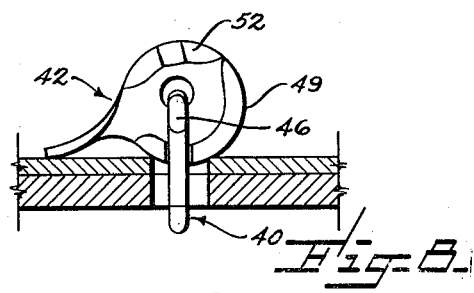

Figs. 5 and 6 similarly show a modified form of my fastener in its released position; and Figs. 7 and 8 illustrate the applied position of this modified form.

Referring first to Figs. 1 to 4, the form of fastener there shown is composed fundamentally of three parts: an expansive anchor 10, a base 11 and a camming member 12. Anchor member 10 is made in a general U-formation, of resilient wire or other suitable material, and preferably pre-stressed to take normally the collapsed position shown best in Fig. 1. In preferred detail, anchor member 10 has two generally parallel legs 14 which extend from head portion 15 and carry at or near their ends lateral anchoring projections 17. These anchoring projections may take various forms, but are shown as simple outward and upward bends of the leg ends. They are sufficiently small that with anchor 10 in its normal collapsed position they may be readily passed into or through the opening or openings 18 in one or more sheets or plates 19 which the fastener is designed to secure together or to which the fastener is to be secured.

Figure 1:
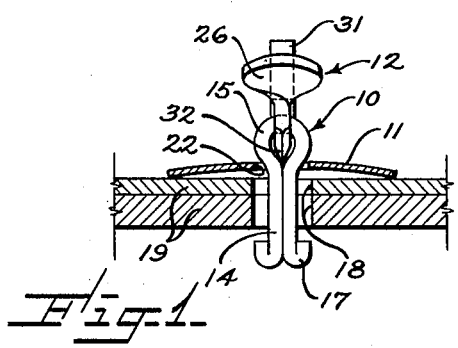
Fig. 1 is an end view and Fig. 2 a side view, both partly in section, of one preferred form of my invention, showing it in its released position as used for securing two sheets or plates together.
Figure 2:
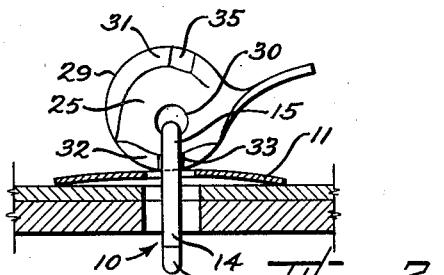

Base 11 is formed of a resilient material, preferably metal pre-stressed like a spring washer to take normally the sectionally curved configuration shown in Figs. 1 and 2. When resiliently compressed in thickness, (Figs. 3 and 4) this base becomes substantially flat in configuration. It can, but need not, be circular in plan, and is pierced with an opening 22 through which the two legs of the anchor pass. The base and anchor may be assembled by forcing anchors 17 through opening 22, the anchors then preventing those parts from accidental disassembly.

Camming member 12 in the form illustrated comprises two sections, the cam proper 25, and the handle section 26. The cam proper is generally in the form of a flat disk bounded by the substantially circular camming edge 29. An aperture 30 eccentrically placed in the disk receives the head portion 15 of anchor 10. The part of the circular body which is furthest removed from aperture 30 is thickened, as illustrated at 31. That part of camming edge 29 with smallest eccentric radius is preferably beveled to form the blade 32 which fits between the upper ends of the two legs 14 where they separate to form head 15. This maintains the plane of cam 25 parallel to the axis of anchor 10, facilitating manipulation of the device. A generally radial groove or notch 33 can be formed in the surface 32 to act as a detent, receiving the anchor leg and tending to prevent relative rotation of cam 12 and anchor 10, and to maintain the device in its open position (Figs. 1 and 2).

The edge 32 gradually widens along the circumference of the cam, leading smoothly into the relatively thick section 31. As the cam is rotated upon anchor head 15 by manipulation of handle 26 from the position of Figs. 1 and 2 to that of Figs. 3 and 4, the cam directly performs two distinct functions. The beveled portion 32 of the cam edge 29 enters between the contracted legs 14 and, as the cam is swung further around, the thicker part 31 of the camming member wedges the legs apart to the position shown in Fig. 3. The legs are then pressed against the periphery of hole 18 in plates 19. At the same time the outer cam edge 29, riding on the outer face of base 11 (the upper face in the drawings), applies tension to the legs 14 tending to pull them outward through aperture 22.

Figure 3:
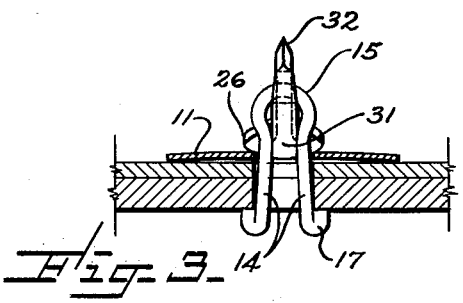
Figs. 3 and 4 are views similar to Figs. 1 and 2, respectively, showing the fastener in its applied position.
Figure 4:
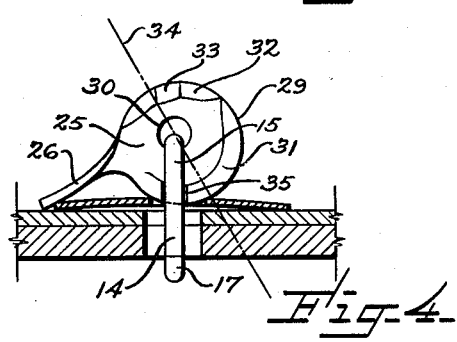

This brings anchoring projections 17 on legs 14 against the inner face of plates 18 and presses base 11 against their outer face, effectively clamping them together. The axis of eccentricity of peripheral cam surface 29 is preferably oriented as indicated at 34 in Fig. 4 (roughly at right angles to handle 26) so that the cam passes over center to reach its anchoring position, preventing the fastener from working loose. Further locking action can be provided by means of a depression 35 in the raised camming surface 31, so placed as to receive the anchor leg when in the clamping position (Figs. 3 and 4).

The clamp can be released by simple rotation of cam member 12 into its released position, when anchor 10 can readily be withdrawn.

The resilience of base 11 provides for the fastener being applied tightly to plate thicknesses of a considerable variation. However, that resilient function may be dispensed with, base 11 being used simply as a flat washer or eliminated entirely.

Figs. 5 to 8 show a second form of my fastener in which the base 11 of Figs. 1 to 4 is eliminated. In this modification the entire fastener consists of only two pieces, the anchor member 40 and cam member 42. The general structure and mode of operation of this form is similar to that already described, but when the cam is moved to clamping position (Figs. 7 and 8) the cam edge 49 comes directly in contact with the outer rim of the hole 18 in which the fastener is being secured. The clamping pressure is thus applied by the cam upon upper plate 19 directly instead of through spring base 11.

In order to provide satisfactory spring action, for example to take up manufacturing tolerances both in the fastener and in the parts which it is designed to fit, I prefer to form head 45 of anchor member 40 as illustrated in Figs. 5 to 8 with rather widely spaced flat bends 46 which provide additional flexibility and resilience in the head. This is particularly desirable in the present form which omits the spring base, but it can be used also with the form shown in Figs. 1 to 4. With this head formation the beveled portion 52 of the cam edge preferably penetrates relatively far between legs 44, even in release position (Figs. 5 and 6). The legs are formed with a tapered opening between their upper ends to receive the cam edge. The cam member 42 is thus held in proper relation to anchor member 40 when the fastener is released and also when it is completely removed from the work. Also the head 45 of the anchor can be formed with a central upward deviation as shown at 47, tending to prevent the cam from becoming displaced to the side. Except as described, the structure and functions of the parts of Figs. 5 to 8 are the same as have been described for Figs. 1 to 4.

It will be noted that although my fasteners are made very simple, the last described form having only two parts, they nevertheless perform all the functions normally associated with fasteners of this general type. This is possible only because the parts are so contrived that each performs several functions. Thus the cam member acts to separate the legs of the anchor, to draw the anchor upward against the lower plate and to press down upon the upper plate either directly or through flat spring base 11; and the anchor member provides the necessary resiliency as well as performing the usual function of gripping the work.

For some uses, the anchoring projections 17 on the legs are not necessary and may be omitted either in effect or completely. In some situations the simple frictional engagement of the forcibly spread legs with the wall of a hole is sufficient to hold the applied fastener in place.

It will be understood that this invention is directed primarily to novel operating means for a fastener, and I have made no attempt to describe all the various forms which the invention can take, and particularly the various forms of the anchoring elements themselves by which the fastener can be adapted to various specific applications. I do not intend this fact, nor the particular illustrative forms of my device which I have described, to limit the scope of my invention.

I claim:

1. A fastener comprising in combination an anchor member with essentially parallel legs adapted to be inserted in an opening, and an anchor moving cam associated with the anchor member and rotatable with respect thereto in a plane longitudinal of the legs and transverse of their plane, said cam being adapted upon rotation to enter between the legs of the anchor, moving them apart into spaced anchoring position.

2. A fastener comprising in combination an anchor member substantially of elongate U-shape whose legs are adapted to be inserted endwise in an opening which extends inwardly from an outer face of a plate or the like, and an anchor moving cam rotatably mounted on the head of the U-shaped anchor member, said cam being adapted upon rotation to enter between the legs of the anchor, moving them apart into spaced anchoring position.

3. A fastener comprising in combination an anchor member substantially of elongate U-shape whose legs are adapted to be inserted endwise in an opening which extends inwardly from an outer face of a plate or the like, and an anchor moving cam rotatably mounted on the head of the U-shaped anchor member, said cam being adapted upon rotation to enter between the legs of the anchor, moving them apart into spaced anchoring position, the cam surface having a depression adapted to receive a leg of the anchor and restrain the said rotation.

4. A fastener comprising in combination an anchor member substantially of elongate U-shape whose legs are adapted to be inserted endwise in an opening which extends inwardly from an outer face of a plate or the like, said anchor member having anchoring formations at the inner inserted ends of its legs, and an anchor moving wedge associated with the leg connecting head of the U-shaped anchor member, said wedge extending between the anchor legs and having wedging formations which, upon movement of the wedge between the legs, spread the legs to move their anchoring formations into engagement with the edges of the opening and also exert pressure against the head formation and the plate to exert longitudinal tension on the legs.

5. A fastener as defined in claim 4, and also including a resiliently compressible plate surrounding the legs, adapted to bear on the outer face of the plate and against which the cam exerts its pressure.

6. A fastener as defined in claim 4, and in which the leg connecting head of the anchor member is formed for resilient displacement in a direction longitudinal of the legs.

7. A fastener comprising in combination an anchor member substantially of elongate U-shape whose legs are adapted to be inserted endwise in an opening which extends inwardly from an outer face of a plate or the like, said anchor member having anchoring formations at the inner inserted ends of its legs, and an anchor moving cam rotatably mounted on the leg-connecting head of the U-shaped anchor member, said cam being adapted upon rotation to enter between the legs and to move said anchoring formations upon the legs of the anchor into spaced anchoring position with relation to the edges of the opening and also to exert pressure against the outer face of the plate and thereby to exert longitudinal tension on the legs.

8. A fastener as defined in claim 4, and also including a resiliently compressible plate surrounding the legs, adapted to bear on the outer face of the plate and against which the cam exerts its pressure.

9. A fastener as defined in claim 4, and in which the leg connecting head of the anchor member is formed for resilient displacement in a direction longitudinal of the legs.

10. A fastener comprising in combination an anchor member substantially of elongate U-shape whose legs are adapted to be inserted endwise in an opening which extends inwardly from an outer face of a plate or the like, said anchor member having anchoring formations at the inner inserted ends of its legs adapted to engage the edges of the opening at the opposite face of the plate, and an anchor moving cam directly rotatably mounted on the leg-connecting portion of the U-shaped anchor and adapted to rotate in a plane which is parallel to the length of the anchor at right angles to the plane of the U-formation, said cam having a peripheral cam face which is eccentric to the axis of rotation of the cam and adapted by pressure on the plate to exert longitudinal tension on the legs.

11. A fastener as defined in claim 10, and also including a resiliently compressible plate surrounding the legs, adapted to bear on the outer face of the plate and against which the cam exerts its pressure.

12. A fastener as defined in claim 10, and in which the leg connecting portion of the anchor member is formed for resilient displacement in a direction longitudinal of the legs.

13. A fastener comprising in combination an anchor member substantially of elongate U-shape whose legs are resiliently joined together, are adapted to be inserted endwise in an opening in a plate or the like, and have anchoring formations at their inner inserted ends, and an anchor moving cam mounted for eccentric rotation about the leg connecting portion of the anchor in a plane which is parallel to the length of the anchor and at right angles to the plane of the U-formation, said cam being adapted upon rotation to move the anchor legs apart to move their anchoring formations into engagement with the edges of the opening and to exert pressure against the outer face of the plate, thereby exerting longitudinal tension on the legs.

14. A fastener comprising in combination an anchor member substantially of elongate U-shape whose legs are adapted to be inserted endwise in an opening which extends inwardly from an outer face of a plate or the like, said anchor member having anchoring formations at the inner inserted ends of its legs adapted to engage the edges of the opening at the opposite face of the plate, the leg connecting head of the U-shaped anchor being formed for resilient displacement in a direction longitudinal of the legs, and an anchor moving wedge associated with the leg connecting head of the U-shaped anchor member, said wedge extending between the anchor legs and having wedging formations which, upon movement of the wedge between the legs, exert pressure against the head formation and the plate to exert longitudinal tension on the legs.

15. A fastener comprising in combination an anchor member substantially of elongate U-shape whose legs are adapted to be inserted endwise in an opening which extends inwardly from an outer face of a plate or the like, said anchor member having anchoring formations at the inner inserted ends of its legs, adapted to engage the edges of the opening at the opposite face of the plate, the leg connecting head of the U-shaped anchor being formed for resilient displacement in a direction longitudinal of the legs, and an anchor moving wedge associated with and bearing on the resilient head formation and adapted, by movement in a direction along the face of the plate, to move the head formation outwardly with reference to the plate and exert longitudinal tension on the legs.

LAWRENCE E. CARSON.

REFERENCES CITED

The following references are of record in the file of this patent:

UNITED STATES PATENTS

| Number | Name | Date |
|---|---|---|
| 2,357,711 | Vinson | Sept. 5, 1944 |

Certificate of Correction

Patent No. 2,514,692                                                                          July 11, 1950

LAWRENCE E. CARSON

It is hereby certified that error appears in the printed specification of the above numbered patent requiring correction as follows:

Column 5, lines 17 and 22, for the claim reference numeral "4" read 7;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*